(12) United States Patent
Lindoff

(10) Patent No.: US 6,373,888 B1
(45) Date of Patent: Apr. 16, 2002

(54) ESTIMATED CHANNEL WITH VARIABLE NUMBER OF TAPS

(75) Inventor: Bengt Lindoff, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/168,605

(22) Filed: Oct. 9, 1998

(51) Int. Cl.$^7$ .......................... H03H 7/30; H04L 27/06
(52) U.S. Cl. ...................................... 375/231; 375/316
(58) Field of Search ................................ 375/229, 231, 375/232, 316, 346, 230; 570/292; 708/322, 323; 381/947, 103; 333/28 R; 379/406.1

(56) References Cited

U.S. PATENT DOCUMENTS

| | | | |
|---|---|---|---|
| 5,644,603 A | | 7/1997 | Ushirokawa |
| 6,002,716 A | * | 12/1999 | Meyer et al. ................ 375/231 |
| 6,084,862 A | * | 7/2000 | Bjork et al. ................. 370/292 |
| 6,144,710 A | * | 11/2000 | Chen et al. .................. 375/346 |
| 6,222,592 B1 | * | 4/2001 | Patel .......................... 348/614 |

FOREIGN PATENT DOCUMENTS

| | | |
|---|---|---|
| EP | 0496152 A2 | 7/1992 |
| EP | 0615347 A1 | 9/1994 |
| WO | WO96/13910 | 5/1996 |

OTHER PUBLICATIONS

Young Jae Lee, et al., "Application of a Periodic Lattice Filter for Identifying Flexible Structures," Journal of Guidance, Control and Dynamics, vol. 16, No. 6, Nov. 1, 1993, pp. 1109–1117.

John G. Proakis, Ph.D., P.E., Digital Communications, Second Edition, New York: McGraw–Hill, 1989, pp. 548–615.

A. S. Khayrallah, et al., "Improved Channel Estimation with Side Information," 1997 IEEE V47$^{th}$ Vehicular Technology Conference, 1997, pp. 1049–1051.

Alexandra Duel–Hallen, et al., "Delayed Decision–Feedback Sequence Estimation," IEEE Transaction on Communications, vol. 37, No. 5, May 1, 1989, pp. 428–436.

* cited by examiner

Primary Examiner—Tesfaldet Bocure
Assistant Examiner—Emmanuel Bayard
(74) Attorney, Agent, or Firm—Burns, Doane, Swecker & Mathis, L.L.P.

(57) ABSTRACT

Channel estimation is performed by receiving a received training sequence portion of a radio signal, and estimating a number of channel model structures based on the received training sequence and a predetermined training sequence. For each of the channel model structures, corresponding coefficients are determined by using all of a set of one or more taps associated with the corresponding channel model structure and no others. For each of the channel model structures, a variance measure is generated that represents an amount of variance between an estimated value generated by the channel model structure and a received signal value. An optimum channel model structure is selected from the channel model structures, based on the variance measures, and a number of states associated with the optimum channel model structure is generated. Equalization techniques are then used to generate the decided symbol from the received signal, the optimum channel model structure and the number of states.

12 Claims, 4 Drawing Sheets

ESTIMATED CHANNEL WITH VARIABLE NUMBER OF TAPS

BACKGROUND

The present invention relates to digital communications, and more particularly to channel estimators and equalization methods utilized in digital communications.

In recent years, digital wireless communication systems have been used to convey a variety of information between multiple locations. With digital communications, information is translated into a digital or binary form, referred to as bits, for communications purposes. The transmitter maps this bit stream into a modulated symbol stream, which is detected at the digital receiver and mapped back into bits and information.

In digital wireless communications, the radio environment presents many difficulties that impede successful communications, for example, those caused by the many signal paths traversed by radio signals before arriving at a receiver. One difficulty occurs when the multiple signal paths are much different in length. In this case, time dispersion occurs, in which multiple signal images arrive at the receiver antenna at different times, giving rise to signal echoes. This causes inter-symbol interference (ISI), a phenomenon in which the echoes of one symbol interfere with subsequent symbols.

Time dispersion can be mitigated by using an equalizer. Common forms of equalization are provided by linear equalizers, decision-feedback equalizers, and maximum-likelihood sequence-estimation (MLSE) equalizers. A linear equalizer tries to undo the effects of the channel by filtering the received signal. A decision-feedback equalizer exploits previous symbol detections to cancel out the inter-symbol interference from echoes of these previous symbols. Finally, an MLSE equalizer hypothesizes various transmitted symbol sequences and, with a model of the dispersive channel, determines which hypothesis best fits the received data. These equalization techniques are well known to those skilled in the art, and can be found in standard textbooks such as J. G. Proakis, *Digital Communications*, 2nd ed., New York: McGraw-Hill, 1989. Equalizers are commonly used in TDMA systems, such as D-AMPS and GSM.

Of the three common equalization techniques, MLSE equalization is preferable from the point of view of performance accuracy. In the MLSE equalizer, all possible transmitted symbol sequences are considered. For each hypothetical sequence, the received signal samples are predicted using a model of the multipath channel. The difference between the predicted received signal samples and the actual received signal samples, referred to as the prediction error, gives an indication of how good a particular hypothesis is. The squared magnitude of the prediction error is used as a metric to evaluate a particular hypothesis. This metric is accumulated for different hypotheses for use in determining which hypotheses are better. This process is efficiently realized using the Viterbi algorithm, which is a form of dynamic programming.

However, under certain operating conditions, signals arriving at a receiver may not create significant levels of inter-symbol interference. When ISI is insignificant, or absent, the equalizer actually adds more noise to the detection statistic than it removes, particularly when the channel varies rapidly. Under these conditions, it would be desirable to switch the equalizer off in favor of another detection device, e.g., a differential detector, which may perform better under non-time dispersive conditions. Moreover, an equalizer is relatively complex computationally compared with a differential detector. Thus, periodically switching off the equalizer in favor of a differential detector would save MIPS which, in turn, would reduce battery consumption.

As another example, in direct sequence CDMA systems, RAKE receivers are commonly employed. However, if too many RAKE taps are employed, performance degrades.

Accordingly, it would be desirable to provide a receiver in which an appropriate detection technique could be dynamically identified and implemented, e.g., a detector which uses an appropriate number of channel taps.

FIG. 1 depicts a conventional channel estimator and channel equalizer for use in a burst transmission system such as, for example, the GSM system. Conventional apparatuses of the type illustrated in FIG. 1 are well-known, and are described in standard textbooks such as the above-referenced one by Proakis. A received signal 101 with predefined burst length is stored in a memory 103. A portion of the received burst that includes a received training signal is supplied by the memory 103 to a channel estimator 104. The K:th order (K fixed) channel filter taps $\{h_i\}_{i=1,K}$ are computed from the received signal while referring to an input training signal 102. The channel filter taps are then fed to an equalizer 105 having a fixed number of states, $M^{K-1}$ where M is the number of possible symbols. The equalizer 105 may be any of a number of types of equalizer, including a Viterbi equalizer. The output of the equalizer 105 is the decided symbol 106.

U.S. Pat. No. 5,644,603, which issued on Jul. 1, 1997 to Ushirokawa, describes a channel estimator and channel equalizer having a variable number of states. This is illustrated in FIG. 2. A received signal 201 with a predefined burst length is stored in a memory 203. A portion of the received burst that includes a received training signal is supplied by the memory 203 to a channel estimator 204. The K:th order (K fixed) channel filter taps $\{h_i\}_{i=1,K}$ are computed from the received signal while referring to an input training signal 202. The channel filter taps are then fed into a control unit 206 that identifies the last one of the filter taps that has a larger power than a predetermined threshold power level. The power in those filter taps that lie beyond the last identified filter tap can be assumed to be zero. When it is decided that the latest response is the L:th response ($L \leq K$), the filter taps $\{h_i\}_{L=1,L}$ are fed to a Viterbi equalizer 205 having $M^{L-1}$ states. The output of the Viterbi equalizer 205 is the decided symbol 207.

As explained in the above-referenced U.S. Pat. No. 5,644,603, a primary reason for reducing the number of states is to reduce the average amount of required processing. A reduction in processing load translates into a reduction in power consumption. International patent publication WO 96/13910 explains that a reduction in the small channel filter taps can also result in a better model of the true radio channel.

SUMMARY

The foregoing and other objects are achieved in channel estimation methods and apparatuses for use in a radio receiver. In accordance with one aspect of the invention, channel estimation comprises receiving a received training sequence portion of a radio signal; and estimating a plurality of channel model structures based on the received training sequence and a predetermined training sequence, wherein, for each of the plurality of channel model structures, corresponding coefficients are determined by using all of a set of one or more taps associated with the corresponding channel model structure and no others.

In another aspect of the invention, at least one of the plurality of channel model structures is a channel model structure of order K, and having fewer than K coefficients.

In yet another aspect of the invention, channel estimation further comprises filtering a non-filtered training sequence to generate the predetermined training sequence, wherein the filtering is substantially the same as known filtering to which a transmitted training sequence has been subjected.

In still another aspect of the invention, channel estimation further comprises generating, for each of the plurality of channel model structures, a variance measure representing an amount of variance between an estimated value generated by the channel model structure and a received signal value.

In yet another aspect of the invention, channel estimation further comprises selecting an optimum channel model structure from the plurality of channel model structures, based on the variance measures.

In still another aspect of the invention, selection of an optimum channel model is performed by using the variance measures in an Akaike Information Criteria test.

In yet another aspect of the invention, channel estimation further comprises generating a number of states associated with the optimum channel model structure; and supplying the optimum channel model structure and the number of states to an equalizer. The equalizer may then generate a decided signal from a received radio signal, the optimum channel model structure and the number of states.

BRIEF DESCRIPTION OF THE DRAWINGS

The objects and advantages of the invention will be understood by reading the following detailed description in conjunction with the drawings in which.

DETAILED DESCRIPTION

Figure 1:
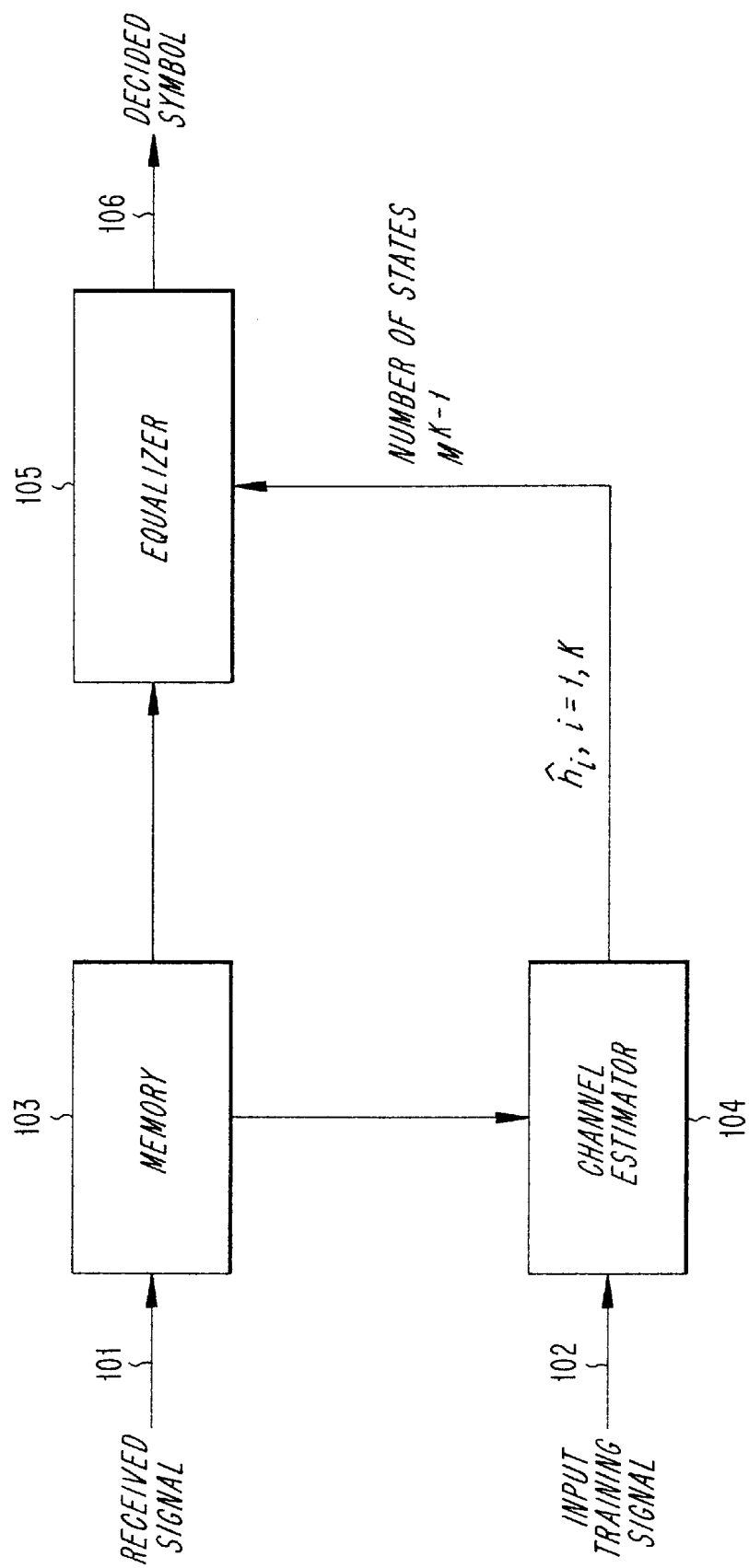
FIG. 1 depicts a conventional channel estimator and channel equalizer for use in a burst transmission system such as, for example, the GSM system.
Figure 2:
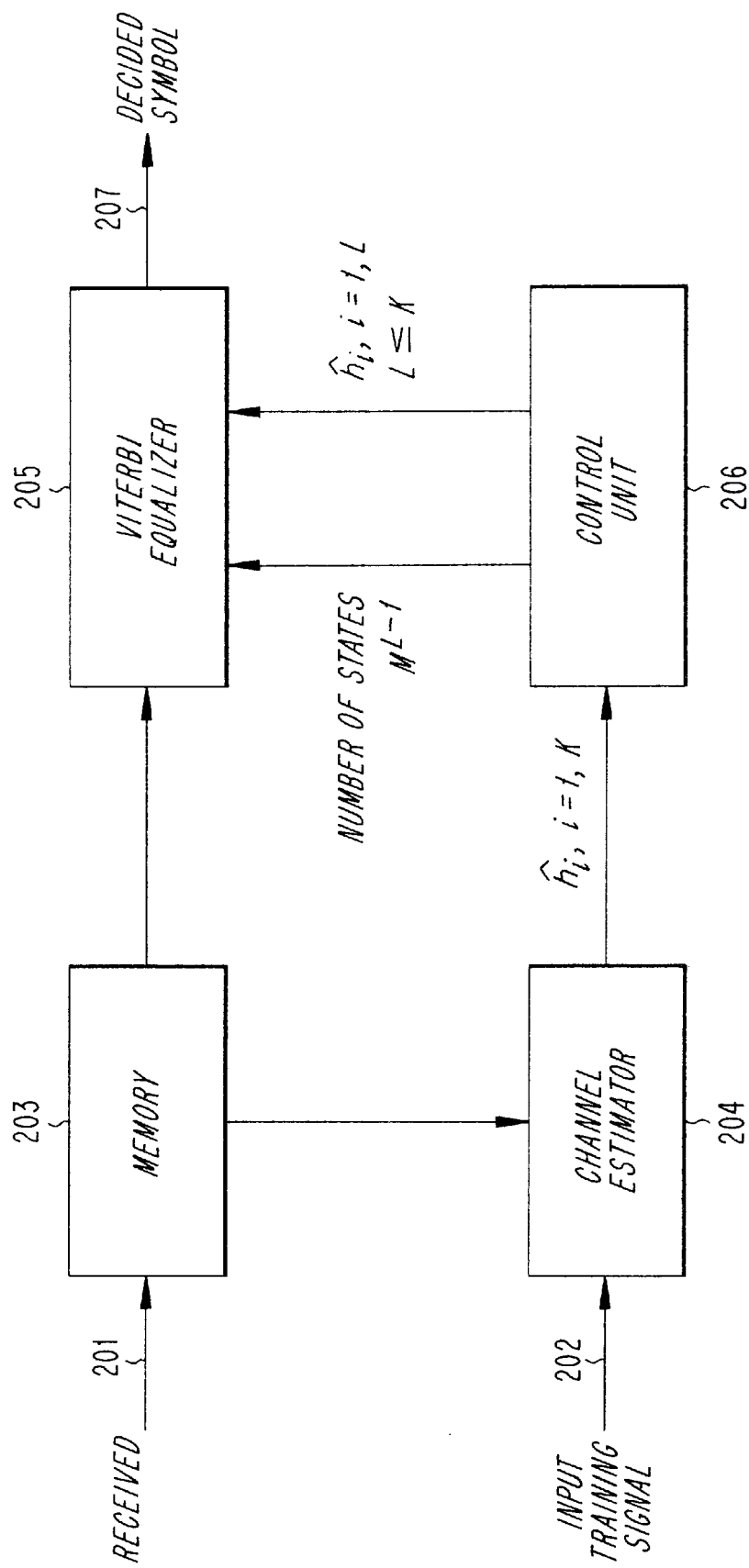
FIG. 2 depicts a conventional channel estimator and channel equalizer having a variable number of states.

The various features of the invention will now be described with respect to the figures, in which like parts are identified with the same reference characters. Although the following description is provided in the context of non-spread systems, those skilled in the are will appreciate that the present invention is equally applicable to spread (e.g., CDMA) systems as well.

Figure 3:
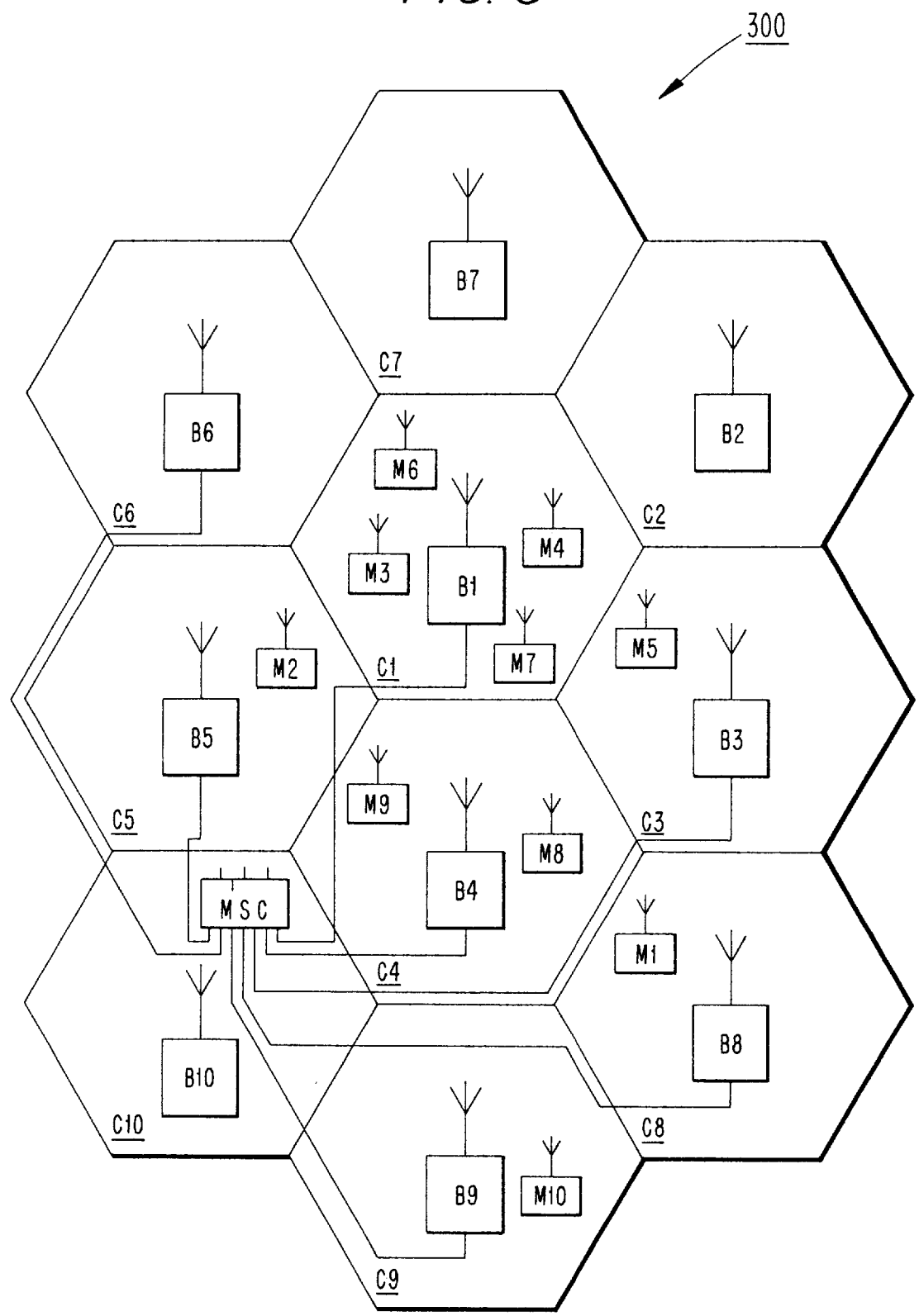
FIG. 3 is a block diagram illustrating ten cells in a cellular mobile radio telephone system to which the invention applies.

FIG. 3 is a schematic diagram illustrating the relationship between 10 cells (C1–C10) in a typical cellular telephone network 300 (herein referred to as a "cellular network") such as D-AMPS. Generally, a cellular network would have far more than ten cells; however, ten is sufficient for illustrative purposes.

In each cell C1 to C10, there is a base station B1 to B10. Although FIG. 3 shows the base stations located toward the center of each cell, base stations may be located anywhere in the cell. Base stations located toward the center typically employ omni-directional antennas, while base stations located toward a cell boundary typically employ directional antennas.

The cellular network 300 depicted in FIG. 3 also has a mobile switching center (MSC). The MSC connects to each of the base stations by cable, radio links, or both (not illustrated in FIG. 1). The MSC is also connected to a fixed telephone switching unit (also not illustrated in FIG. 3). The mobiles M1–M10 represent the mobile telephone units. Of course, the mobiles can move about in one cell or they can move about from one cell to another cell. Typically, there are far more mobiles than ten. Again, showing ten mobiles is sufficient for illustrative purposes.

Each mobile station includes a receiver (also not illustrated in FIG. 3) for receiving signals transmitted over the air interface from a base station to which that mobile station is currently listening. The receiver processes the received information symbols, such as by using demodulation and detection techniques, to extract the information symbols included in the received signals.

Conventionally, these receivers included a detection device, such as an equalizer or a differential detector, used to identify the information symbols in the received signal stream. The selection of a particular detection device for inclusion in a receiver, such as an equalizer having some predetermined, fixed number of channel taps, was typically made based upon the worst case radio environment in which the receiver was intended to operate. The present invention, however, takes another approach, in which a channel estimator is provided that has a variable number of taps in the channel filter. The variable number of taps permits the model complexity to be adapted as a function of inter-symbol interference in the received symbol sequence. Optimization of the model structure based on the received data sequence increases the likelihood of good equalization which, in turn, results in a decrease in bit error rate. Furthermore, by reducing the model complexity whenever possible, the average processing amount (and hence the power consumption) in the equalizer is reduced, compared to the situation in which the equalizer is operated with the maximum number of states all of the time.

Figure 4:
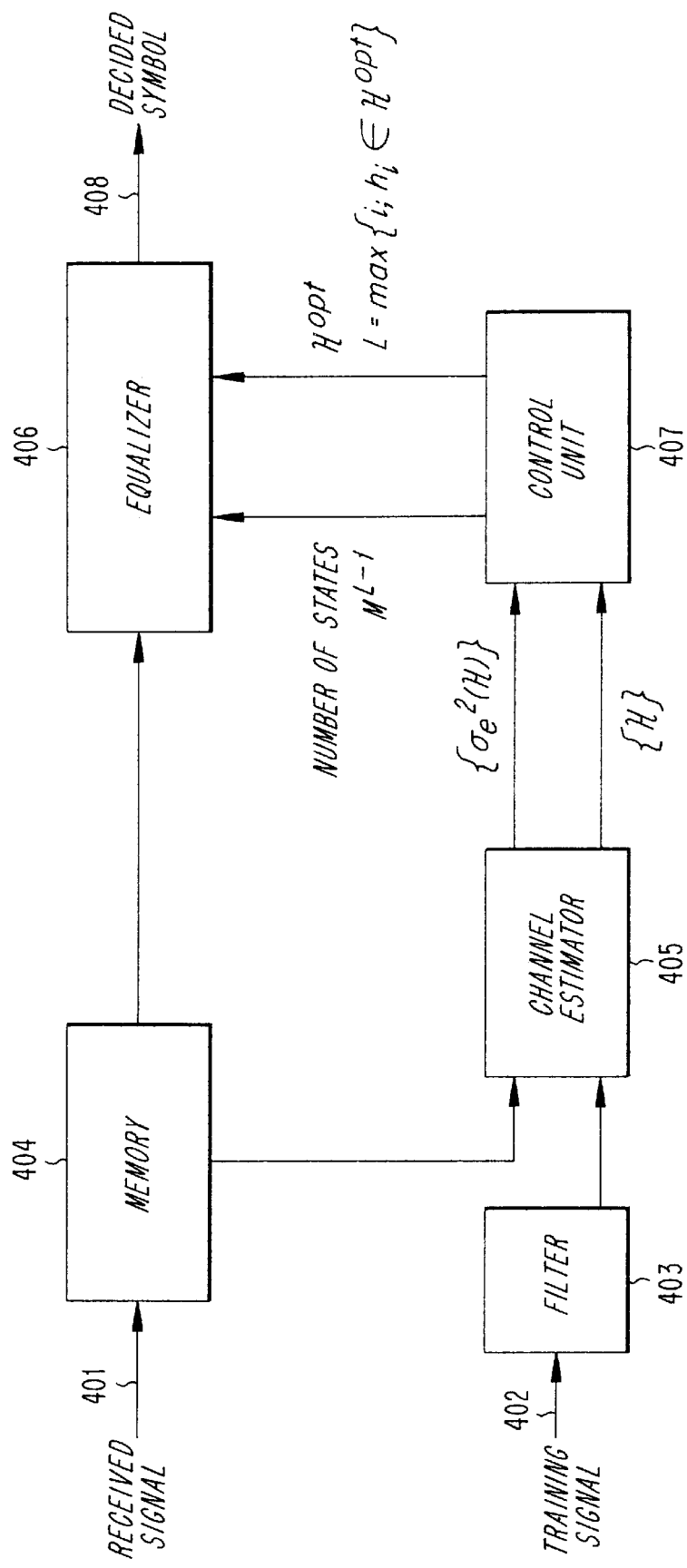
FIG. 4 depicts an exemplary embodiment of a receiver, including a channel estimator and control unit, that operates in accordance with the invention.

Referring now to FIG. 4, an exemplary embodiment of a receiver that operates in accordance with the invention is depicted. A received signal 401 having a predefined burst length is stored in a memory 404. A portion of the received signal corresponding to a received training sequence is supplied by the memory 404 to a channel estimator 405. The training sequence is predetermined, and known to both the transmitter and the receiver. Accordingly, the receiver generates its own training signal 402 based on the predetermined training sequence, and supplies this to a filter 403, which may, for example, be constructed to operate like those known parts of the total filtering to which the transmitted training sequence has been subjected. The known parts of the total filtering may be the transmitter and receiver filters, so that any differences between the filtered training sequence and the actual received training sequence should then be attributable only to the filtering performed by the radio channel itself. This makes for a more accurate channel estimate.

The filtered training sequence is then supplied by the filter 403 to the channel estimator 405. In accordance with one aspect of the invention, the channel estimator uses the filtered training sequence and the received training sequence to estimate all (or a subset) of the possible channel model structures, $\mathcal{H}$, up to a fixed order K. In each case, estimation is performed in accordance with known techniques, such as by means of the least squares technique.

Each of the possible channel model structures contains only those taps associated with a corresponding one of the possible combinations of taps. For example, assume that K=3 and that the channel can be modeled by a Finite Impulse Response (FIR) filter. It follows that there are three channel models having only a single tap:

$$H_{channel}(z)=h_0;$$

$$H_{channel}(z)=h_1 z^{-1};$$

and $$H_{channel}(z)=h_2 z^{-2}.$$

At the other extreme, there is only one channel model having three taps, namely:

$$H_{channel}(z)=h_0+h_1 z^{-1}+h_2 z^{-2}.$$

In accordance with one aspect of the invention, for each of the channel models, corresponding coefficients are determined by using all of a set of one or more taps associated with the corresponding channel model structure and no others, so that in general, an i:th coefficient associated with one model (e.g., any of the one-tap models) will not have the same value as the i:th coefficient associated with any other model. For example, determining the $h_0$ for the one-tap model (which has only one coefficient, namely $h_0$) is performed by determining, at the outset, that only one tap exists in the model. By contrast, conventional techniques that utilize variable numbers of taps always assume a maximum number of taps (e.g., 3), and merely discard coefficients that are not going to be used for a particular model.

Returning to our example, then, for the case in which K=3 seven different model structures can be estimated (although not all embodiments of the invention will use all possible model structures). If all seven of these possible model structures are estimated in a particular embodiment, $\mathcal{H}$, is defined by:

$$\mathcal{H}=\{\hat{h}_0^0, \hat{h}_1^1, \hat{h}_2^2, [\hat{h}_0^{0,1}\ \hat{h}_1^{0,1}], [\hat{h}_0^{0,2}\ \hat{h}_2^{0,2}], [\hat{h}_1^{1,2}$$

$$\hat{h}_2^{1,2}], [\hat{h}_0^{0,1,2}, \hat{h}_1^{0,1,2}, \hat{h}_2^{0,1,2}]\}$$

where for each coefficient, $\hat{h}_a^{a,b,\cdots,z}$, the superscript indicates which taps are present in a particular model, and the subscript represents which particular one of these coefficients this coefficient represents (for the particular model).

The channel tap coefficients for each of the estimated model structures (i.e., $\mathcal{H}$) are supplied to a control unit 407. The channel estimator 405 also determines the variance of the residuals from each model fit, and supplies these variance values ($\sigma_e^2(\mathcal{H})$) to the control unit 407 as well. To determine the variance, the residual (e) for each model fit is computed in accordance with:

$$e_t^{mod}=Y_t-\hat{Y}_t(\text{mod}), t=1,\ldots,n$$

where $Y_t$ is the measured received signal data, n is the length of the training sequence, and $$\hat{Y}_t(\text{mod}) = \sum_{i=a,b,\ldots z} \hat{h}_i^{a,b,\cdots z} d_{t-i}$$

where $d_{t-i}$ is a predetermined transmitted symbol.

The variance of the residual is then:

$$[\hat{\sigma}_t^{mod}]^2 = \frac{1}{n}\sum_{i=1}^{n} |e_t^{mod}|^2 [ = \text{the mean value of the squared residuals}]$$

Based on the variances, model order and channel filter taps, the control unit 407 decides which model best fits the received data sequence. This best model is designated herein as $\mathcal{H}^{OPT}$. The decision to determine the best model is preferably based on a statistical information test, such as the Akaike Information Criteria (AIC) test described in L. Ljung, *System Identification—Theory for the User,* Prentice hall Inc., New Jersey, 1987. In alternative embodiments, other statistical model validation tests may be used in place of the AIC test. In accordance with the AIC test, a value L is computed for each model in accordance with:

$$L_i = [\hat{\sigma}_t^{mod}]^2 + \frac{dim\{mod(i)\}}{n}, i = 1, \ldots, \{\text{number of models in } \mathcal{H}\}$$

where dim[A]=dimension of A (i.e., number of channel taps); and n=length of data set (i.e, length of training sequence). An optimal model, $\mathcal{H}^{OPt}$ is chosen in accordance with:

$$\mathcal{H}^{OPT} = \arg\min_{\mathcal{H}} L_i$$

that is, the model that best fits the data according to the measure $L_i$ is the one selected as the optimal model.

The control unit 407 supplies the channel filter taps for the best model, together with the number of states to an equalizer 406, which may for example be an MLSE Viterbi equalizer or alternatively a Delayed Decision-Feedback Sequence Estimator (DFSE) such as that described in A. Duel-Hallen and C. Heegard, "Delayed decision-feedback sequence estimation", *IEEE Transactions on Communications,* 37:5:428–436, 1989, which is hereby incorporated herein by reference. The number of states is determined in accordance with:

Number of states=$M^{L-1}$ where M is the number of possible symbols, and L is the highest index, i, that is associated with any $h_i \in \mathcal{H}^{OPT}$.

The output of the equalizer 406 is the decided symbol 408.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A channel estimator for use in a radio receiver, the channel estimator comprising:
   an input for receiving a received training sequence portion of a radio signal;
   circuitry for estimating a plurality of channel model structures based on the received training sequence and a predetermined training sequence, wherein, for each of the plurality of channel model structures, corresponding coefficients are determined by using all of a set of one or more taps associated with the corresponding channel model structure and no others;

circuitry for generating, for each of the plurality of channel model structures, a variance measure representing an amount of variance between an estimated value generated by the channel model structure and a received signal value; and a control unit that selects an optimum channel model structure from the plurality of channel model structures, based on the variance measures.

2. The channel estimator of claim 1, wherein at least one of the plurality of channel model structures is a channel model structure of order K, and having fewer than K coefficients.

3. The channel estimator of claim 1, further comprising a filter for supplying the predetermined training sequence, wherein the filter operates on a non-filtered training sequence signal, and performs filtering that is substantially the same as known filtering to which a transmitted training sequence has been subjected.

4. The channel estimator of claim 1, wherein the control unit uses the variance measures in an Akaike Information Criteria test to select the optimum channel model structure from the plurality of channel model structures.

5. The channel estimator of claim 1, wherein the control unit comprises:

circuitry for generating a number of states associated with the optimum channel model structure; and circuitry for supplying the optimum channel model structure and the number of states to an equalizer.

6. A receiver comprising:

processing circuitry for receiving a radio signal and producing signal samples therefrom;

a memory, coupled to the processing circuitry, for storing the signal samples;

a channel estimator, coupled to an output of the memory, comprising:

circuitry for receiving a received training sequence portion of the stored signal samples;

circuitry for estimating a plurality of channel model structures based on the received training sequence and a predetermined training sequence, wherein, for each of the plurality of channel model structures, corresponding coefficients are determined by using all of a set of one or more taps associated with the corresponding channel model structure and no others; and circuitry for generating, for each of the plurality of channel model structures, a variance measure representing an amount of variance between an estimated value generated by the channel model structure and a received signal value;

a control unit, coupled to the channel estimator, comprising:

circuitry for selecting an optimum channel model structure from the plurality of channel model structures, based on the variance measures; and circuitry for generating a number of states associated with the optimum channel model structure; and an equalizer, coupled to receive the optimum channel model structure and the number of states from the control unit, for generating a decided symbol.

7. A channel estimation method for use in a radio receiver, the channel estimation method comprising the steps of:

receiving a received training sequence portion of a radio signal;

estimating a plurality of channel model structures based on the received training sequence and a predetermined training sequence, wherein, for each of the plurality of channel model structures, corresponding coefficients are determined by using all of a set of one or more taps associated with the corresponding channel model structure and no others;

generating, for each of the plurality of channel model structures, a variance measure representing an amount of variance between an estimated value generated by the channel model structure and a received signal value; and selecting an optimum channel model structure from the plurality of channel model structures, based on the variance measures.

8. The channel estimation method of claim 7, wherein at least one of the plurality of channel model structures is a channel model structure of order K, and having fewer than K coefficients.

9. The channel estimation method of claim 7, further comprising the steps of filtering a non-filtered training sequence to generate the predetermined training sequence, wherein the filtering is substantially the same as known filtering to which a transmitted training sequence has been subjected.

10. The channel estimation method of claim 7, wherein the step of selecting an optimum channel model is performed by using the variance measures in an Akaike Information Criteria test.

11. The channel estimation method of claim 7, further comprising the steps of:

generating a number of states associated with the optimum channel model structure; and supplying the optimum channel model structure and the number of states to an equalizer.

12. A method of generating a decided symbol from a radio signal, comprising the steps of:

receiving the radio signal and producing signal samples therefrom;

storing the signal samples in a memory;

estimating a plurality of channel model structures based on a received training sequence portion of the stored signal and a predetermined training sequence, wherein, for each of the plurality of channel model structures, corresponding coefficients are determined by using all of a set of one or more taps associated with the corresponding channel model structure and no others;

generating, for each of the plurality of channel model structures, a variance measure representing an amount of variance between an estimated value generated by the channel model structure and a received signal value;

selecting an optimum channel model structure from the plurality of channel model structures, based on the variance measures;

generating a number of states associated with the optimum channel model structure; and using equalization techniques to generate the decided symbol from one or more of the stored signal samples, the optimum channel model structure and the number of states.

* * * * *